US012628035B2

(12) United States Patent
Wang et al.

(10) Patent No.: US 12,628,035 B2
(45) Date of Patent: May 12, 2026

(54) METHOD AND DEVICE FOR REPORTING BUFFER STATUS REPORT, AND RELAY USER EQUIPMENT

(71) Applicant: DATANG MOBILE COMMUNICATIONS EQUIPMENT CO., LTD., Beijing (CN)

(72) Inventors: Da Wang, Beijing (CN); Yali Zhao, Beijing (CN); Huiying Zhang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 567 days.

(21) Appl. No.: 18/004,666

(22) PCT Filed: Jul. 9, 2021

(86) PCT No.: PCT/CN2021/105511
§ 371 (c)(1),
(2) Date: Jan. 6, 2023

(87) PCT Pub. No.: WO2022/007952
PCT Pub. Date: Jan. 13, 2022

(65) Prior Publication Data
US 2023/0413106 A1 Dec. 21, 2023

(30) Foreign Application Priority Data
Jul. 9, 2020 (CN) .......................... 202010656987.8

(51) Int. Cl.
*H04W 28/02* (2009.01)
*H04W 72/21* (2023.01)

(52) U.S. Cl.
CPC ....... *H04W 28/0278* (2013.01); *H04W 72/21* (2023.01)

(58) Field of Classification Search
CPC ............. H04W 28/0278; H04W 72/21; H04W 40/22; H04W 72/25; H04W 76/14;
(Continued)

(56) References Cited

U.S. PATENT DOCUMENTS

2017/0353819 A1* 12/2017 Yin ...................... H04W 72/21
2018/0054755 A1 2/2018 Lee et al.
(Continued)

FOREIGN PATENT DOCUMENTS

| CN | 101998700 A | 3/2011 |
| CN | 102045851 A | 5/2011 |

(Continued)

OTHER PUBLICATIONS

Samsung, Sidelink BSR Triggering, 3GPP TSG RAN WG2 Meeting #92 R2-156156. Anaheim, USA, Nov. 16-20, 2015 ( Year: 2015).*
(Continued)

*Primary Examiner* — Ayaz R Sheikh
*Assistant Examiner* — Tarell A Hampton
(74) *Attorney, Agent, or Firm* — Ladas & Parry, LLP

(57) ABSTRACT

A method for reporting a BSR is provided. The method includes: triggering the reporting of the BSR in the case that a triggering condition for reporting the BSR has been met; transmitting the BSR to a network device.

20 Claims, 4 Drawing Sheets triggering reporting of a BSR in the case that a triggering condition for reporting the BSR has been met
51 transmitting the BSR to a network device
52

(58) Field of Classification Search

CPC .... H04W 88/04; H04W 72/20; H04L 5/0094; H04L 5/0053

See application file for complete search history.

(56) References Cited

U.S. PATENT DOCUMENTS

| | | | | |
|---|---|---|---|---|
| 2019/0335356 A1 | | 10/2019 | Lee et al. | |
| 2020/0029353 A1* | | 1/2020 | Xu | H04W 72/21 |
| 2020/0100306 A1* | | 3/2020 | Ayaz | H04W 88/04 |
| 2021/0274545 A1* | | 9/2021 | Adjakple | H04W 72/21 |
| 2022/0361082 A1* | | 11/2022 | Wu | H04W 72/40 |
| 2022/0408466 A1* | | 12/2022 | Liu | H04W 28/0278 |

FOREIGN PATENT DOCUMENTS

| | | |
|---|---|---|
| CN | 111148147 A | 5/2020 |
| EP | 3255950 A1 | 12/2017 |
| EP | 3512276 A1 | 7/2019 |

OTHER PUBLICATIONS

Nokia Networks, Events that trigger sidelink BSR, 3GPP TSG-RAN WG2 Meeting #91 R2-153709 Beijing, China, Aug. 24-28, 2015 (Year: 2015).*

MediaTek Inc., On sidelink BSR, 3GPP TSG-RAN WG2 Meeting #105bis R2-1903874, Xi'an, China, Apr. 8-12, 2019 ( Year: 2019).*

International Search Report for PCT/CN2021/105511 issued on Sep. 29, 2021 and its English Translation provided by WIPO.

Written Opinion for PCT/CN2021/105511 issued on Sep. 29, 2021 and its English Translation provided by WIPO.

International Report on Patentibily for PCT/CN2021/105511 issued on Jan. 10, 2023 and its English translation provided by WIPO.

"Considerations on SL BSR for relay UE," 3GPP TSG RAN WG2 Meeting #92, R2-156316, Anaheim, USA, Nov. 16-20, 2015, Source: ITL, Agenda Item: 7.5.5, Source: ITL, all pages.

First Office Action and search report for the corresponding Chinese Patent Application 202010656987.8 issued on Mar. 29, 2023, and its English Translation provided by the Chinese Patent Office.

Extended European Search Report for the corresponding European Patent Application No. 21838829.6 issued by the European Patent Office on Oct. 24, 2023.

"Other aspects on physical layer procedures for NR-V2X," 3GPP TSG RAN WG1 #96bis, R1-1905379, Xi'an, China, Apr. 8-12, 2019, Agenda Item: 7.2.4.8, Source: Fujitsu.

"Latency Reduction in L2 relay Architecture," 3GPP TSG-RAN WG2#98, R2-1705124, Hangzhou, China, May 15-19, 2017, Agenda Item: 9.1.2.1, Source: Sequans Communications.

"User and Control Plane Procedures for L2 UE-to-NW Relay," 3GPP TSG-RAN WG2 Meeting #111-e, R2-2006610, Electronic, Aug. 17-28, 2020, Source: CATT, Agenda Item: 8.7.3.

* cited by examiner first relayed-to
UE (UE 1)

relay UE second relayed-
to UE (UE 2)

triggering reporting of a BSR in the case that a triggering condition for reporting the BSR has been met    51 transmitting the BSR to a network device    52 processing module    61 transceiver module    62

60

METHOD AND DEVICE FOR REPORTING BUFFER STATUS REPORT, AND RELAY USER EQUIPMENT

CROSS-REFERENCE TO RELATED APPLICATION

This application is the U.S. national phase of PCT Application No. PCT/CN2021/105511 filed on Jul. 9, 2021, which claims a priority of the Chinese patent application No. 202010656987.8 filed in China on Jul. 9, 2020, both of which are incorporated by reference herein.

TECHNICAL FIELD

The present disclosure relates to the field of communication technology, in particular to a method and a device for reporting a Buffer Status Report (BSR), and a relay User Equipment (UE).

BACKGROUND

In related art, as shown in FIG. 1, a cellular network communication mode is adopted, i.e., uplink/downlink data and/or control information is transmitted between a UE and a network device via a Uu interface.

As shown in FIG. 2, Sidelink communication refers to data transmission between neighboring UEs within a short range through Sidelink (also known as PC5). A radio interface corresponding to the Sidelink is called as a Sidelink interface or a PC5 interface.

FIG. 3 shows a UE-to-network relay mode. In order to extend a network coverage, one solution lies in the introduction of a relay. The relay is a UE having a relay function. For UE-to-network relay, a Uu interface is used between the relay and the network, and a PC5 interface (also called as Sidelink interface in the protocol) is used between the relay and a relayed-to UE. A link between the relay and the network is called as backhaul link for the relayed-to UE.

FIG. 4 shows a UE-to-UE relay mode. For UE-to-UE relay, a Sidelink interface is used between a relay UE and a relayed-to UE.

For UE-to-network relay, a Uu interface is used between the relay and the network, and a PC5 interface (also called as Sidelink interface in the protocol) is used between the relay and a relayed-to UE. A link between the relay and the network is called as backhaul link for the relayed-to UE.

SUMMARY

An object of the present disclosure is to provide a method and a device for reporting a BSR, and a relay UE, so as to enable a UE to apply to a network device for resource as soon as possible, thereby to transmit a service rapidly through the resource.

In order to solve the above-mentioned problem, the present disclosure provides the following technical solutions.

In one aspect, the present disclosure provides in some embodiments a method for reporting a BSR, for a relay UE, including: triggering the reporting of the BSR in the case that a triggering condition for reporting the BSR has been met; and transmitting the BSR to a network device.

In another aspect, the present disclosure provides in some embodiments a relay UE, including a transceiver, a processor, a memory, and a program instruction stored in the memory and executed by the processor. The processor is configured to execute the program instruction, so as to:

trigger the reporting of the BSR in the case that a triggering condition for reporting the BSR has been met; and transmit the BSR to a network device.

DETAILED DESCRIPTION

Figure 1:
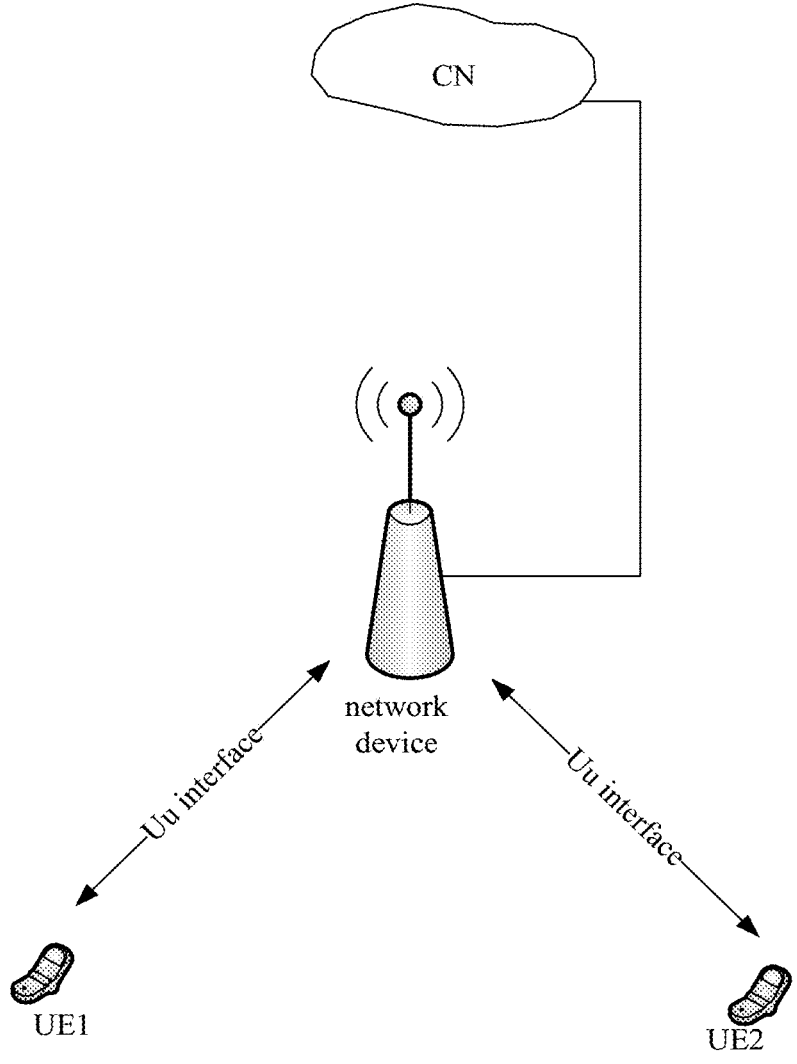
FIG. 1 is a schematic view showing a communication mode in an LTE system under centralized control of a network.
Figure 2:
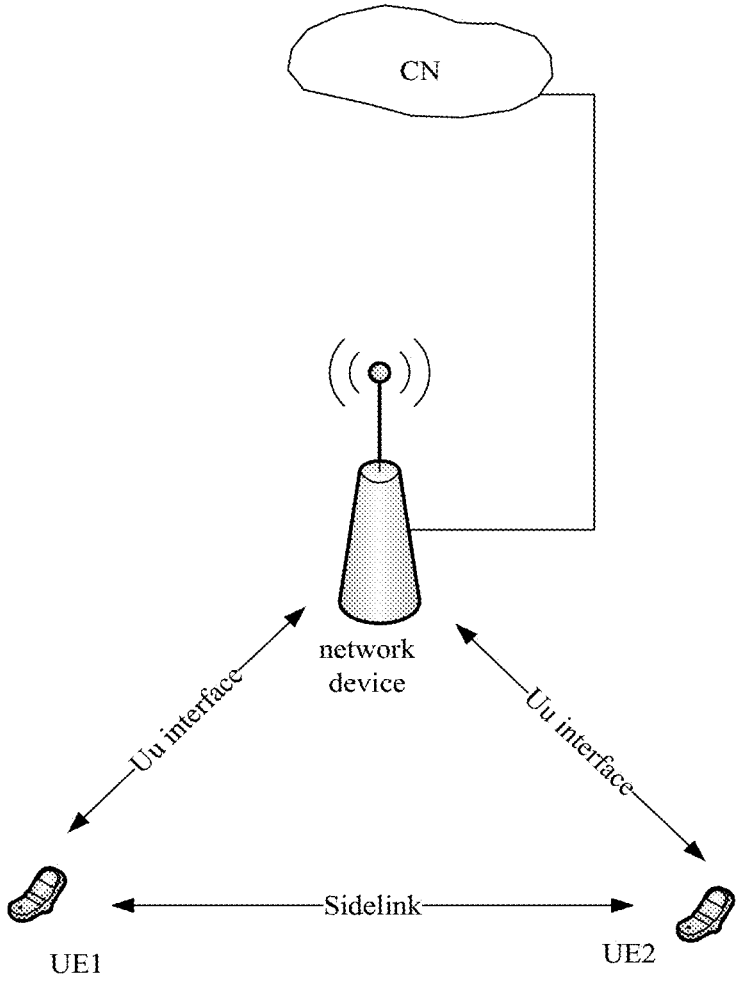
FIG. 2 is a schematic view showing Device-to-Device (D2D) discovery/communication.
Figure 3:
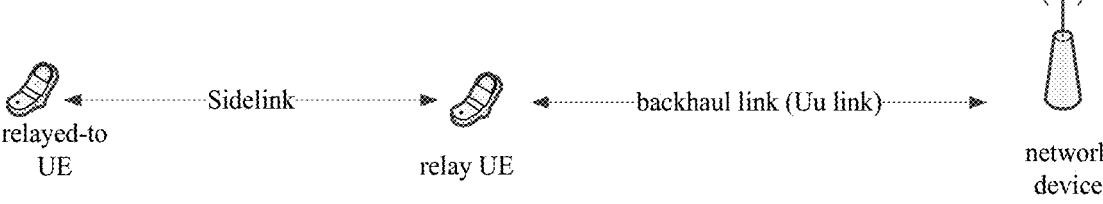
FIG. 3 is a schematic view showing UE-to-network relay.
Figure 4:
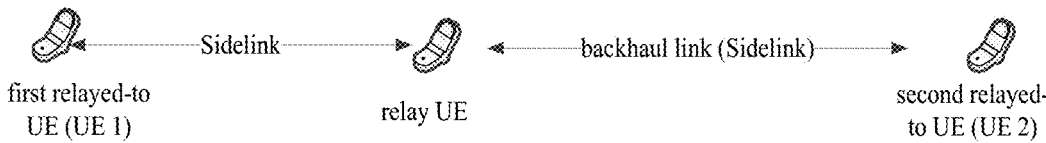
FIG. 4 is a schematic view showing UE-to-UE relay.

Exemplary embodiments of the present disclosure will be described in more detail below with reference to the accompanying drawings. Although exemplary embodiments of the present disclosure are shown in the drawings, it should be understood that the present disclosure may be embodied in various forms and should not be limited by the embodiments set forth herein. Rather, these embodiments are provided for more thorough understanding of the present disclosure and to fully convey the scope of the present disclosure to those skilled in the art.

Currently, pre-emptive BSR (pBSR) is used by a relay node to apply to a base station node for resource in advance, so as to facilitate the relay node to forward information from its child node rapidly. A base station serves as a relay to forward information between base stations. A previous-level node of the relay node is a parent node, and a next-level node of the relay node is a child node.

The pBSR is triggered when: (1) the relay node has received a BSR from its child node; (2) the relay node has transmitted Uplink (UL) grant to the child node.

A specific format of the pBSR is the same as that of a conventional BSR, but the pBSR merely supports a long BSR format, and a buffer size thereof is a value of a size of data expected to be transmitted in future.

For UE-to-UE relay, a Sidelink interface is used between a relay and a relayed-to UE (remote UE). When forwarding data, the relay needs to transmit a BSR to the base station, so as to apply for transmission resource. In the related art, the relay UE is unable to apply to the base station for the resource as soon as possible.

Figure 5:
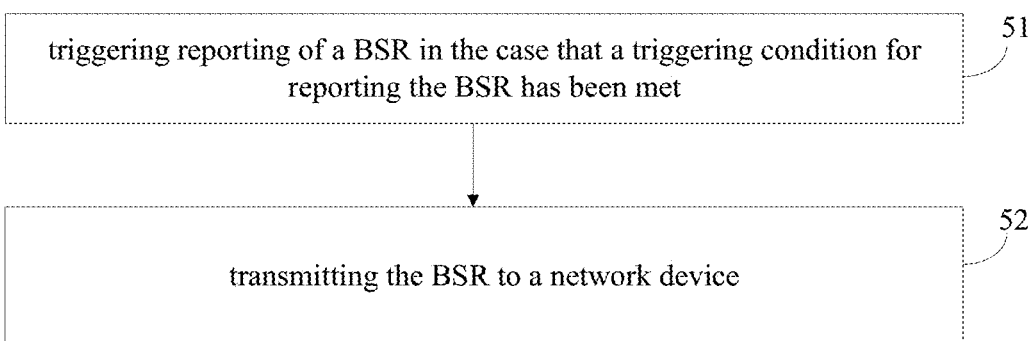
FIG. 5 is a flow chart of a method for reporting a BSR according to an embodiment of the present disclosure.

As shown in FIG. 5, the present disclosure provides in some embodiments a method for reporting a BSR for a relay UE, which includes: Step 51 of triggering the reporting of the BSR in the case that a triggering condition for reporting the BSR has been met; and Step 52 of transmitting the BSR to a network device.

According to the embodiments of the present disclosure, when the triggering condition for reporting the BSR has been met, the reporting of the BSR is triggered, and then the BSR is transmitted to the network device. As a result, it is able for the UE to apply to the network device (e.g., a base station) for resource as soon as possible, thereby to transmit a service rapidly through the resource.

In a possible embodiment of the present disclosure, Step 51 includes Step 511 of triggering the reporting of the BSR in the case that a first triggering condition for reporting the BSR has been met in data service transmission performed by a relayed-to UE with the network device through the relay UE.

Here, the data service transmission performed by the relayed-to UE with the network device through the relay UE includes: uplink transmission performed by the relayed-to UE for transmitting a data service to the network device through the relay UE; or downlink transmission performed by the relayed-to UE for transmitting a data service to the network device through the relay UE.

In a possible embodiment of the present disclosure, Step 51 includes Step 512 of triggering the reporting of the BSR in the case that a second triggering condition for reporting the BSR has been met in the data service transmission performed by a first relayed-to UE with a second relayed-to UE through the relay UE.

In the embodiments of the present disclosure, in Step 511, the triggering the reporting of the BSR in the case that the first triggering condition for reporting the BSR has been met in the data service transmission performed by the relayed-to UE with the network device through the relay UE includes at least one of the followings.

Step 5111: when SCI has been received by the relay UE from the relayed-to UE and reserved resource is indicated in the SCI, triggering the reporting of the BSR.

Here, the reserved resource indicated in the SCI is resource reserved for transmission after current transmission, e.g., resource reserved for N times of transmission after the current transmission, where N is a greater than or equal to 1.

When the reserved resource is indicated in the SCI, it means that the relayed-to UE will transmit data to the network device in future. Hence, the relay UE transmits the BSR in advance to apply for a Uu (an air interface between the relay UE and the network device) uplink resource, so that subsequent data from the relayed-to UE is forwarded to the network device rapidly.

A buffer size of the BSR is a specific value or a maximum value of a size of data capable of being transmitted through the reserved resource indicated in the SCI. When only a value range is calculated, the maximum value thereof is reported, and when a specific value may be calculated, the specific value is reported.

A time for triggering the BSR by the relay UE is determined in accordance with a time for the reserved resource indicated in the SCI. For example, the BSR is triggered at a time point ahead, by t (here, t is greater than or equal to 0), of the time for the reserved resource. In this way, when the Uu uplink resource is allocated by the base station in accordance with the BSR and the relay UE receives data transmitted on the reserved resource, the data is directly transmitted on the Uu uplink resource. A value of t shall not be too large, i.e., the BSR shall not be triggered too early; otherwise, even when the Uu uplink resource has been allocated by the base station, the relay UE has not received the data transmitted on the reserved resource, so it is impossible to transmit the data on the Uu uplink resource. In addition, the BSR shall not be triggered too late; otherwise, when the Uu uplink resource is allocated by the base station too late, a large delay may occur for the data transmission.

Step 5112: when the relay UE has received the SCI from the relayed-to UE, has not received data successfully, and has fed back a message (Non-Acknowledgement (NACK))

indicating that the data has been received unsuccessfully to the relayed-to UE, triggering the reporting of the BSR.

Here, when the relay UE has received the SCI from the relayed-to UE but fails to receive any data successfully (i.e., fails to demodulate any data packet successfully), the relay UE transmits the NACK to the relayed-to UE. Upon the receipt of the NACK, the relayed-to UE retransmits the data packet. Hence, the relay UE may predict that the data packet is to be retransmitted by the relayed-to UE, and the data may be transmitted to the network device too. At this time, the relay UE may transmit the BSR in advance to apply for the Uu uplink resource, so that the data from the relayed-to UE is rapidly forwarded to the network device.

The buffer size of the BSR is a specific value or a maximum value of a size of data capable of being transmitted through a Sidelink resource indicated in the SCI (when only a value range is calculated, the maximum value thereof is reported, and when a specific value can be calculated, the specific value is reported), or a same value of a size of data transmitted currently (when the data is to be transmitted in response to the NACK).

A time for triggering the BSR by the relay UE is determined in accordance with a time for feeding back the NACK, e.g., the BSR is triggered at a time point t after the feedback of the NACK.

Step 5113: when the relay UE has received a request for accessing a network from the relayed-to UE, or a process of requesting, by the relayed-to UE, to access the network has been completed, or the relay UE has received a Sidelink connection establishment request from the relayed-to UE, or a Sidelink connection between the relay UE and the relayed-to UE has been established successfully, triggering reporting of the BSR.

Here, when the relay UE has received the request for accessing the network from the relayed-to UE, it means that there is a service to be transmitted by the relayed-to UE to the network.

When the process of requesting, by the relayed-to UE, to access the network has been completed, the relayed-to UE has accessed the network successfully. For example, the relayed-to UE initiates the request for accessing the network, and the request is forwarded by the relay UE to the network. The network accepts the request, and transmits a network access completion message to the relayed-to UE through the relay UE, i.e., the relayed-to UE has accessed the network successfully. Then, the relayed-to UE transmits a data service to the network.

When the relay UE has received the Sidelink connection establishment request from the relayed-to UE or when the Sidelink connection has been established between the relay UE and the relayed-to UE, the Sidelink connection is established between the relayed-to UE and the relay UE, then the relayed-to UE accesses the network and establishes the connection with the network device, and then the relayed-to UE transmits the service to the network device. Hence, the Sidelink connection is established between the relayed-to UE and the relay UE so as to facilitate the establishment of the connection between the relayed-to UE and the network device, thereby to transmit the request for accessing the network or the service to the network device.

In the above cases, it means that there is a service or signaling to be transmitted by the relayed-to UE to the network subsequently. Hence, the relay UE may transmit the BSR in advance to apply for the Uu uplink resource, so as to rapidly forward the data from the relayed-to UE to the network.

The buffer size of the BSR is a value of a size of data or signaling expected to be transmitted by the relayed-to UE in future.

The time for triggering the BSR by the relay UE is determined in accordance with a time when the request for accessing the network has been received from the relayed-to UE, or a time when the process of requesting, by the relayed-to UE, to access the network has been completed, or a time when the Sidelink connection establishment request has been received by the relay UE from the relayed-to UE, or a time when the Sidelink connection has been established successfully between the relay UE and the relayed-to UE. For example, the BSR is triggered at a time point t after the request for accessing the network has been received from the relayed-to UE, or after the process of requesting, by the relayed-to UE, to access the network has been completed, or after the Sidelink connection establishment request has been received by the relay UE from the relayed-to UE, or after the Sidelink connection has been established successfully between the relay UE and the relayed-to UE. For example, when the Sidelink connection is established at a time point a, the time for triggering the BSR is a+t. For another example, when the Sidelink connection is established at a time point a, the time for triggering the BSR is a time point t after a.

In a possible embodiment of the present disclosure, in Step 511, the triggering the reporting of the BSR in the case that the first triggering condition for reporting the BSR has been met in the data service transmission performed by the relayed-to UE with the network device through the relay UE includes at least one of the followings.

Step 5114: triggering the reporting of the BSR when SCI has been transmitted by the relay UE to the relayed-to UE.

Here, when the SCI has been transmitted by the relay UE to the relayed-to UE, the SCI indicates data transmission. There is such a circumstance that the relayed-to UE receives the SCI but fails to receive the data accurately. The relayed-to UE may transmit the NACK to the relay UE, and the relay UE may retransmit the data.

Hence, when the relay UE has transmitted a data packet to the relayed-to UE, in order to facilitate the subsequent retransmission, the relay UE may transmit the BSR in advance to apply for the Sidelink resource, so that the relay UE rapidly transmits the data to the relayed-to UE. Here, the data packet is transmitted by the relay UE to the relayed-to UE, so the Sidelink resource is applied.

The time for triggering the BSR by the relay UE is determined in accordance with a time when the SCI is transmitted by the relay UE to the relayed-to UE, e.g., the BSR is triggered at a time point t after the SCI is transmitted by the relay UE to the relayed-to UE.

Step 5115: triggering the reporting of the BSR when the SCI transmitted by the relay UE to the relayed-to UE indicates that a quantity of times of transmission possibly to be performed in future, triggering the reporting of the BSR.

Here, the transmission possibly to be performed in future indicated in the SCI is retransmission after the current transmission, e.g., N times of transmission in future may be indicated in the SCI, where N is greater than or equal to 1.

When the quantity of times of transmission to be performed in future is indicated in the SCI, it means that the data is to be transmitted by the relay UE to the relayed-to UE in future. Hence, the relay UE may transmit the BSR in advance to apply for the Sidelink resource, so that the data is subsequently transmitted by the relay UE to the relayed-to UE rapidly.

The buffer size of the BSR is a specific value or a maximum value of a size of data to be transmitted in the SCI. When a numerical range is calculated, the maximum value thereof is reported, and when a specific value is calculated, the specific value is reported. Alternatively, in retransmission, a value of a size of the data to be transmitted is the same as a value of a size of data transmitted currently.

The time for triggering the BSR by the relay UE is determined in accordance with a time when the data is to be transmitted in future by the relay UE as indicated in the SCI. For example, as indicated in the SCI, the BSR is triggered at a time point t before the transmission to be performed in future.

Step 5116: triggering the reporting of the BSR when DCI received by the relay UE from the network device indicates data for downlink transmission, triggering the reporting of the BSR.

When the data for downlink transmission is indicated in the DCI, it means that the data is to be forwarded by the relay UE to the relayed-to UE in future, so the relay UE may transmit the BSR in advance to apply for the Sidelink resource, so that the data is more rapidly transmitted by the relay UE to the relayed-to UE.

A buffer size of the BSR is a value of a size of data for the downlink transmission indicated in the DCI, or a value greater than the size of the data for the downlink transmission, so as to apply for more resource.

The time for triggering the BSR by the relay UE is determined in accordance with a time when the DCI is received by the relay UE, e.g., the BSR is triggered at a time point t after the reception of the DCI.

Step 5117: triggering the reporting of the BSR when the relay UE has transmitted a connection establishment request message to the relayed-to UE or has received a connection establishment request message from the relayed-to UE.

Here, before communication between the relay UE and the relayed-to UE, the connection needs to be established between the relay UE and the relayed-to UE through a Sidelink interface, so the relay UE needs to transmit the connection establishment request message to the relayed-to UE. Alternatively, the relay UE receives the connection establishment request message from the relayed-to UE (i.e., a connection establishment process is initiated by the relay UE or the relayed-to UE), and then other signaling, e.g., encryption information and a connection establishment completion message, needs to be transmitted between the relay UE and the relayed-to UE, so as to complete the connection establishment process.

In order to transmit the other controlling signaling through the Sidelink interface subsequently, the relay UE may transmit the BSR in advance to apply for the Sidelink resource, so as to enable the relay UE to rapidly transmit the other control signaling to the relayed-to UE, thereby to rapidly establish the connection with the relayed-to UE.

The buffer size of the BSR is the buffer size occupied by the control signaling expected to be transmitted.

The time for triggering the BSR by the relay UE is determined in accordance with a time when the connection establishment request message is transmitted by the relay UE to the relayed-to UE or a time when the connection establishment request message is received by the relay UE from the first relayed-to UE or the second relayed-to UE. For example, the BSR is triggered at a time point t after the connection establishment request message is transmitted by the relay UE to the relayed-to UE or after the connection establishment request message is received by the relay UE from the relayed-to UE.

Step 5118: triggering the reporting of the BSR when the relay UE has received a network paging message for the relayed-to UE or has received a system message or a system message update indication about an air interface between the relay UE and the network device.

Here, when a service needs to be transmitted to the relayed-to UE, the network device pages the relayed-to UE through the relay UE, i.e., transmits a paging signal to the relayed-to UE.

When the relay UE has received the paging signal transmitted by the network device to the relayed-to UE, it means that service data is to be transmitted subsequently by the network device to the relayed-to UE. Hence, the relay UE may transmit the BSR in advance to apply for the Sidelink resource, so that the relay UE rapidly transmits the data to the relayed-to UE subsequently.

Upon the receipt of the system message or the system message update indication about the Uu interface, the relay UE transmits the system message to the relayed-to UE. Hence, the relay UE may transmit the BSR in advance to apply for the Sidelink resource, so that the relay UE rapidly transmits the system message to the relayed-to UE.

The buffer size of the BSR is a value of a size of data expected to be transmitted by the network device in future, or a value of a size of the system message.

The time for triggering the BSR by the relay UE is determined in accordance with a time when the network paging message is received by the relay UE for the relayed-to UE, or a time when the system message or the system message update indication about the Uu interface is received by the relay UE. For example, the BSR is triggered at a time point t after the network paging message is received by the relay UE for the relayed-to UE, or after the system message or the system message update indication about the Uu interface is received by the relay UE.

In a possible embodiment of the present disclosure, data is transmitted by one relayed-to UE (i.e., remote UE 1) to another relayed-to UE (i.e., remote UE 2). Here, UE 1 is called as a first UE, and UE 2 is called as a second UE. In the embodiments of the present disclosure, the first or second relayed-to UE is merely for illustrative purposes, but shall not be construed as limiting the present disclosure. In Step 512, the triggering the reporting of the BSR in the case that the second triggering condition for reporting the BSR has been met in the data service transmission performed by the first relayed-to UE with the second relayed-to UE through the relay UE includes at least one of the followings.

Step 5121: when the relay UE has received SCI from the first relayed-to UE (UE 1) or the second relayed-to UE (UE 2) and reserved resource is indicated in the SCI, triggering the BSR.

Here, the reserved resource indicated in the SCI is resource reserved for transmission after the current transmission, e.g., resource for the subsequent N times of transmission, where N is greater than or equal to 1.

When the reserved resource is indicated in the SCI, it means that data is to be transmitted by a relayed-to UE to another relayed-to UE. Hence, the relay UE may transmit the BSR in advance to apply for the Sidelink resource, so that the data from the relayed-to UE is rapidly forwarded to the other relayed-to UE.

The buffer size of the BSR is a specific value or a maximum value of a size of data capable of being transmitted through the reserved resource indicated in the SCI. When a numerical range is calculated, the maximum value thereof is reported, and when a specific value is calculated, the specific value is reported.

The time for triggering the BSR by the relay UE is determined in accordance with a time for the reserved resource indicated in the SCI, e.g., the BSR is triggered at a time point ahead, by t, of the time for the reserved resource.

Step 5122: when the relay UE has fed back an NACK indicating that data has been received unsuccessfully to the first relayed-to UE or the second relayed-to UE, triggering the BSR.

Here, when the relay UE has received the SCI from the relayed-to UE but fails to receive any data successfully (i.e., fails to demodulate any data packet successfully), the relay UE transmits the NACK to the relayed-to UE. Upon the receipt of the NACK, the relayed-to UE retransmits the data packet.

Hence, the relay UE may predict that the data packet is to be retransmitted by the relayed-to UE, and the data may be transmitted to the other relayed-to UE too. At this time, the relay UE may transmit the BSR in advance to apply for the Sidelink uplink resource, so that the data from the relayed-to UE is rapidly forwarded to the other relayed-to UE.

The buffer size of the BSR is a specific value or a maximum value of a size of data capable of being transmitted through a Sidelink resource indicated in the SCI. When a numerical range is calculated, the maximum value thereof is reported, and when a specific value is calculated, the specific value is reported.

The time for triggering the BSR by the relay UE is determined in accordance with a time for feeding back the NACK, e.g., the BSR is triggered at a time point t after the feedback of the NACK.

Step 5123: when the relay UE has transmitted the SCI to the first relayed-to UE or the second relayed-to UE, triggering the BSR.

Here, when the SCI is transmitted by the relay UE to the relayed-to UE and the SCI indicates the data transmission, there is such a circumstance where the relayed-to UE receives the SCI but fails to accurately receive the data packet. At this time, the relayed-to UE transmits the NACK to the relay UE, and the data packet is retransmitted by the relay UE.

Hence, when the relay UE has transmitted the data packet to the relayed-to UE, in order to facilitate the subsequent retransmission, the relay UE may transmit the BSR in advance to apply for the Sidelink resource, so that the relay UE rapidly transmits the data to the relayed-to UE. Here, the data packet is transmitted by the relay UE to the relayed-to UE, so the Sidelink resource is applied.

The time for triggering the BSR by the relay UE is determined in accordance with a time when the SCI is transmitted by the relay UE to the relayed-to UE, e.g., the BSR is triggered at a time point t after the SCI is transmitted by the relay UE to the relayed-to UE.

Step 5124: when the SCI transmitted by the relay UE to the first relayed-to UE or the second relayed-to UE indicates the quantity of times of transmission possibly to be performed in future, triggering the BSR.

Here, the transmission possibly to be performed in future as indicated in the SCI is retransmission after the current transmission, e.g., N times of transmission in future may be indicated in the SCI, where N is greater than or equal to 1.

When the quantity of times of transmission to be performed in future is indicated in the SCI, it means that the data is to be transmitted by the relay UE to the relayed-to UE in future. Hence, the relay UE may transmit the BSR in advance to apply for the Sidelink resource, so that the data is subsequently transmitted by the relay UE to the relayed-to UE rapidly.

The buffer size of the BSR is a specific value or a maximum value of a size of data to be transmitted in the SCI. When a numerical range is calculated, the maximum value thereof is reported, and when a specific value is calculated, the specific value is reported. Alternatively, in retransmission, a value of a size of the data to be transmitted is the same as a value of a size of data transmitted currently.

The time for triggering the BSR by the relay UE is determined in accordance with a time when the data is possibly to be transmitted in future as indicated in the SCI by the relay UE. For example, as indicated in the SCI, the BSR is triggered at a time point t before the transmission to be performed.

Step 5125: when the relay UE has transmitted a connection establishment request message to the first relayed-to UE or the second relayed-to UE or has received a connection establishment request message from the relayed-to UE, triggering the BSR.

Here, before communication, the connection needs to be established between the relay UE and the relayed-to UE through a Sidelink interface, so the relay UE needs to transmit the connection establishment request message to the relayed-to UE. Alternatively, the relay UE receives the connection establishment request message from the relayed-to UE (i.e., a connection establishment process is initiated by the relay UE or the relayed-to UE), and then other signaling, e.g., encryption information and a connection establishment completion message, needs to be transmitted between the relay UE and the relayed-to UE so as to complete the connection establishment process.

In order to transmit the other controlling signaling through the Sidelink interface subsequently, the relay UE may transmit the BSR in advance to apply for the Sidelink resource, so as to enable the relay UE to rapidly transmit the other control signaling to the relayed-to UE, thereby to rapidly establish the connection with the relayed-to UE.

The buffer size of the BSR is a value of a buffer size occupied by the control signaling expected to be transmitted subsequently.

The time for triggering the BSR by the relay UE is determined in accordance with a time when the connection establishment request message is transmitted by the relay UE to the relayed-to UE or a time when the connection establishment request message is received by the relay UE from the first relayed-to UE or the second relayed-to UE. For example, the BSR is triggered at a time point t after the connection establishment request message is transmitted by the relay UE to the relayed-to UE or after the connection establishment request message is received by the relay UE from the relayed-to UE.

In a possible embodiment of the present disclosure, Step 52 further includes: Step 521 of transmitting an SR to the network device in accordance with the triggered BSR, so as to apply for resource for transmitting the BSR; and Step 522 of receiving an uplink resource assigned by the network device, and transmitting the BSR to the network device through the uplink resource.

In a possible embodiment of the present disclosure, on the basis of Step 51 and Step 52, in UE-to-network relay uplink service transmission, the method further includes Step 53 of receiving an uplink resource assigned by the network device in accordance with the BSR, and transmitting data from the relayed-to UE through the uplink resource.

In a possible embodiment of the present disclosure, on the basis of Step 51 and Step 52, in UE-to-network relay uplink service transmission, the method further includes Step 54 of receiving a Sidelink resource assigned by the network device in accordance with the BSR, and transmitting data to the relayed-to UE through the Sidelink resource.

In a possible embodiment of the present disclosure, on the basis of Step 51 and Step 52, in UE-to-UE relay uplink service transmission, the method further includes Step 55 of receiving a Sidelink resource assigned by the network device in accordance with the BSR, and transmitting data between the first relayed-to UE and the second relayed-to UE through the Sidelink resource.

The implementation of the above-mentioned method will be described hereinafter in conjunction with specific examples.

For the UE-to-network relay uplink service transmission, a specific process includes the following steps.

Step 1: the reporting of the BSR is triggered by the relay UE to apply for the Uu uplink resource when any of the following conditions has been met: (1.1) when the relay UE has received the SCI from the relayed-to UE and the SCI indicates the reserved resource; the buffered contents carried by the BSR has been described hereinabove, and the method for determining the time for triggering the BSR has also be described hereinabove; (1.2) when the relay UE has fed back the NACK to the relayed-to UE; or (1.3) when the relay UE has received the request for accessing the network from the relayed-to UE, or when the process of requesting, by the relayed-to UE, to access the network has been completed, or when the relay UE has received the Sidelink connection establishment request from the relayed-to UE, or when the Sidelink connection has been established between the relay UE and the relayed-to UE.

Step 2: a Status Report (SR) is triggered in accordance with the triggered BSR.

Step 3: the SR is transmitted to the base station to apply for the resource for transmitting the BSR.

Step 4: the uplink resource assigned by the base station is received for transmitting the BSR.

Step 5: the BSR is transmitted.

Step 6: the uplink resource assigned by the base station is received for transmitting data from the relayed-to UE.

For the UE-to-network relay downlink service transmission, a specific process includes the following steps.

Step 1: the reporting of the BSR is triggered by the relay UE to apply for the Sidelink resource when any of the following conditions has been met: (1.1) when the relay UE has transmitted the SCI to the relayed-to UE and the SCI indicates the reserved resource; (1.2) when the SCI transmitted by the relay UE to the relayed-to UE indicates the quantity of times of transmission possibly to be performed in future; (1.3) when the DCI received by the relay UE from the network device indicates data for the downlink transmission; (1.4) when the relay UE has transmitted the connection establishment request message to the relayed-to UE or has received the connection establishment request message from the relayed-to UE; or (1.5) when the relay UE has received a network paging message for the relayed-to UE or the relay UE has received the system message or system message update indication about the Uu interface. The buffer size of the BSR has been described hereinabove, and the method for determining the time for triggering the BSR has also be described hereinabove.

Step 2: an SR is triggered in accordance with the triggered BSR.

Step 3: the SR is transmitted to the base station to apply for the resource for transmitting the BSR.

Step 4: the uplink resource assigned by the base station is received for transmitting the BSR.

Step 5: the BSR is transmitted.

Step 6: the Sidelink resource assigned by the base station is received for transmitting data to the relayed-to UE.

For UE-to-UE relay, a specific process includes the following steps.

Step 1: the reporting of the BSR is triggered by the relay UE to apply for the Sidelink resource when any of the following conditions has been met: (1.1) when the relay UE has received the SCI from the relayed-to UE 1 or UE 2 and the SCI indicates the reserved resource; (1.2) when the NACK is fed by the relay UE back to the relayed-to UE 1 or UE 2; (1.3) when the SCI is transmitted by the relay UE to the relayed-to UE and the SCI indicates the data transmission; (1.4) when the SCI transmitted by the relay UE to the relayed-to UE indicates the quantity of times of transmission possibly to be performed in future; or (1.5) when the relay UE has transmitted the connection establishment request message to the relayed-to UE or has received the connection establishment request message from the relayed-to UE. The buffer size and buffered content of the BSR have been described hereinabove, and the method for determining the time for triggering the BSR has also be described hereinabove.

Step 2: the SR is triggered in accordance with the triggered BSR.

Step 3: the SR is transmitted to the base station to apply for the resource for transmitting the BSR.

Step 4: the uplink resource assigned by the base station is received for transmitting the BSR.

Step 5: the BSR is transmitted.

Step 6: the Sidelink resource assigned by the base station is received for transmitting data to the relayed-to UE (data to be transmitted by one relayed-to UE to another relayed-to UE).

Based on the above, the methods for triggering the BSR (the BSR is a BSR reported in advance, or pre-emptive BSR), the buffer size of the BSR and a method for determining the time for triggering the BSR has been described hereinabove in UE-to-network relay and UE-to-UE relay. As a result, for a latency-sensitive service, it is able to apply to the base station for resource as soon as possible, thereby to transmit the service rapidly.

Figure 6:
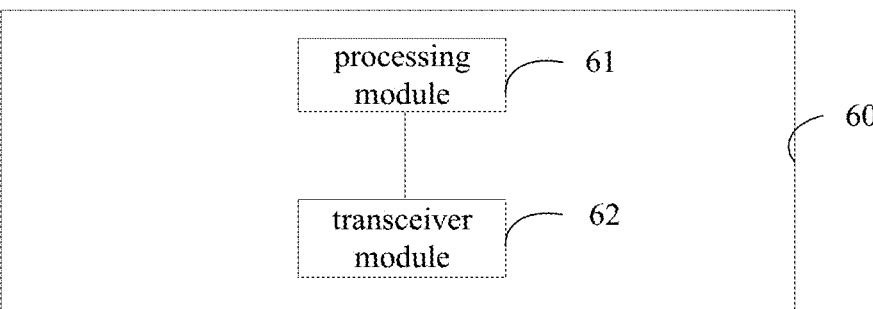
FIG. 6 is a block diagram of a device for reporting a BSR according to an embodiment of the present disclosure.

As shown in FIG. 6, the present disclosure further provides in some embodiments a device 60 for reporting a BSR for a relay UE, which includes: a processing module 61 configured to trigger the reporting of the BSR in the case that a triggering condition for reporting the BSR has been met; and a transceiver module 62 configured to transmit the BSR to a network device.

In a possible embodiment of the present disclosure, the processing module 61 is further configured to trigger the reporting of the BSR in the case that a first triggering condition for reporting the BSR has been met in data service transmission performed by a relayed-to UE with the network device through the relay UE; or the processing module 61 is further configured to trigger the reporting of the BSR in the case that a second triggering condition for reporting the BSR has been met in the data service transmission performed by a first relayed-to UE with a second relayed-to UE through the relay UE.

In a possible embodiment of the present disclosure, the data service transmission performed by the relayed-to UE with the network device through the relay UE includes: uplink transmission performed by the relayed-to UE for transmitting a data service to the network device through the relay UE; or downlink transmission performed by the relayed-to UE for receiving a data service from the network device through the relay UE.

In a possible embodiment of the present disclosure, the triggering the reporting of the BSR in the case that the first triggering condition for reporting the BSR has been met in the data service transmission performed by the relayed-to UE with the network device through the relay UE includes at least one of: when SCI has been received by the relay UE from the relayed-to UE and reserved resource is indicated in the SCI, triggering the reporting of the BSR; when the relay UE has received the SCI from the relayed-to UE, fails to receive any data, and has fed back to the relayed-to UE a message indicating that the data has been received unsuccessfully, triggering the reporting of the BSR; or when the relay UE has received a request for accessing a network from the relayed-to UE, or a process of requesting, by the relayed-to UE, to access the network has been completed, or the relay UE has received a Sidelink connection establishment request from the relayed-to UE, or a Sidelink connection between the relay UE and the relayed-to UE has been established successfully, triggering the reporting of the BSR.

In a possible embodiment of the present disclosure, the reserved resource indicated in the SCI is reserved for N times of transmission after current transmission, where N is a greater than or equal to 1.

In a possible embodiment of the present disclosure, a buffer size of the BSR is a specific value or a maximum value of a size of data capable of being transmitted through the reserved resource indicated in the SCI; or the buffer size of the BSR is a specific value or a maximum value of a size of data capable of being transmitted through a Sidelink resource indicated in the SCI; or the buffer size of the BSR is a value of a size of data or signaling expected to be transmitted by the relayed-to UE in future.

In a possible embodiment of the present disclosure, a time for triggering the BSR is determined in accordance with a time for the reserved resource indicated in the SCI; or the time for triggering the BSR is determined in accordance with a time for a message fed back by the relay UE to the relayed-to UE and indicating that the data has been received unsuccessfully; or the time for triggering the BSR is determined in accordance with at least one of a time when the request for accessing the network has been received from the relayed-to UE, a time when the process of requesting, by the relayed-to UE, to access the network has been completed, a time when the Sidelink connection establishment request has been received by the relay UE from the relayed-to UE, or a time when the Sidelink connection has been established successfully between the relay UE and the relayed-to UE.

In a possible embodiment of the present disclosure, the triggering the reporting of the BSR in the case that the first triggering condition for reporting the BSR has been met in the downlink transmission performed by the relayed-to UE for receiving the data service from the network device through the relay UE comprises at least one of: when SCI has been transmitted by the relay UE to the relayed-to UE, triggering the reporting of the BSR; when the SCI transmitted by the relay UE to the relayed-to UE indicates that a quantity of times of transmission possibly to be performed in future, triggering the reporting of the BSR; when DCI received by the relay UE from the network device indicates data for downlink transmission, triggering the reporting of the BSR; when the relay UE has transmitted a connection establishment request message to the relayed-to UE or has received a connection establishment request message from the relayed-to UE, triggering the reporting of the BSR; or when the relay UE has received a network paging message for the relayed-to UE or has received a system message or a system message update indication about an air interface between the relay UE and the network device, triggering the reporting of the BSR.

In a possible embodiment of the present disclosure, a buffer size of the BSR is a specific value or a maximum value of a size of data capable of being transmitted through reserved resource or data possibly to be transmitted in future that is indicated in the SCI; or the buffer size of the BSR is any value of a size of data for downlink transmission indicated in the DCI or a value greater than the value of the size of the data for the downlink transmission; or the buffer size of the BSR is any value of a buffer size occupied by control signaling expected to be transmitted subsequently; or the buffer size of the BSR is any value of a size of data expected to be transmitted in future by a network or any value of a size of the system message.

In a possible embodiment of the present disclosure, a time for triggering the BSR by the relay UE is determined in accordance with a time for transmitting the SCI by the relay UE to the relayed-to UE; or the time for triggering the BSR by the relay UE is determined in accordance with a time for the transmission possibly to be performed in future or a time for the reserved resource indicated in the SCI by the relay UE; or the time for triggering the BSR by the relay UE is determined in accordance with a time when the DCI is received by the relay UE; or the time for triggering the BSR by the relay UE is determined in accordance with a time when the connection establishment request message is transmitted by the relay UE to the relayed-to UE or the connection establishment request message is received by the relay UE from the relayed-to UE; or the time for triggering the BSR by the relay UE is determined in accordance with a time when the relay UE receives the network paging message for the relayed-to UE or a time when the relay UE receives the system message or the system message update indication from the network.

In a possible embodiment of the present disclosure, the triggering the reporting of the BSR in the case that the second triggering condition for reporting the BSR has been met in the data service transmission performed by the first relayed-to UE with the second relayed-to UE through the relay UE includes at least one of: when the relay UE has received SCI from the first relayed-to UE or the second relayed-to UE and reserved resource is indicated in the SCI, triggering the BSR; when the relay UE has fed back a message indicating that data has been received unsuccessfully to the first relayed-to UE or the second relayed-to UE, triggering the BSR; when the relay UE has transmitted the SCI to the first relayed-to UE or the second relayed-to UE, triggering the BSR; when the SCI transmitted by the relay UE to the first relayed-to UE or the second relayed-to UE indicates the quantity of times of transmission possibly to be performed in future, triggering the BSR; or when the relay UE has transmitted a connection establishment request message to the first relayed-to UE or the second relayed-to UE or has received a connection establishment request message from the first relayed-to UE or the second relayed-to UE, triggering the BSR.

In a possible embodiment of the present disclosure, the reserved resource indicated in the SCI is reserved for N times of transmission after current transmission, where N is a greater than or equal to 1.

In a possible embodiment of the present disclosure, a buffer size of the BSR is a specific value or a maximum value of a size of data capable of being transmitted through the reserved resource indicated in the SCI; or the buffer size of the BSR is a specific value or a maximum value of a size of data capable of being transmitted through a Sidelink resource indicated in the SCI; or the buffer size of the BSR is the buffer size occupied by control signaling expected to be transmitted subsequently.

In a possible embodiment of the present disclosure, a time for triggering the BSR is determined in accordance with a time for the reserved resource indicated in the SCI; or the time for triggering the BSR is determined in accordance with a time for a message indicating that the data has been received unsuccessfully; or the time for triggering the BSR is determined in accordance with a time when the SCI is transmitted by the relay UE to the first relayed-to UE or the second relayed-to UE; or the time for triggering the BSR is determined in accordance with a time for the transmission to be performed by the relay UE in the SCI; or the time for triggering the BSR is determined in accordance with a time when the connection establishment request message is transmitted by the relay UE to the first relayed-to UE or the second relayed-to UE or a time when the connection establishment request message is received by the relay UE from the first relayed-to UE or the second relayed-to UE.

It should be appreciated that, the device in the embodiments of the present disclosure corresponds to the above-mentioned method in FIG. 5, so the implementation of the method may refer to that of the method with a same technical effect. It should be further appreciated that, the device in the embodiments of the present disclosure is used to implement the steps of the above-mentioned method with a same technical effect, which will not be further particularly defined herein.

Figure 7:
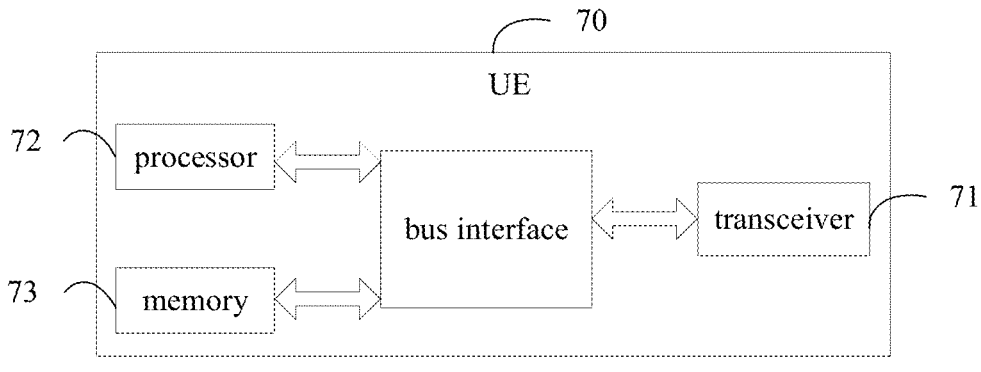
FIG. 7 is a schematic view showing architecture of a relay UE for reporting a BSR according to an embodiment of the present disclosure.

As shown in FIG. 7, the present disclosure further provides in some embodiments a UE 70, which is a relay UE and includes a transceiver 71, a processor 72, a memory 73, and a program instruction stored in the memory 73 and executed by the processor 72. The processor 72 is configured to execute the program instruction, so as to: trigger the reporting of the BSR in the case that a triggering condition for reporting the BSR has been met; and transmit the BSR to a network device.

In a possible embodiment of the present disclosure, the processor 72 is further configured to trigger the reporting of the BSR in the case that a first triggering condition for reporting the BSR has been met in data service transmission performed by a relayed-to UE with the network device through the relay UE; or the processor 72 is further configured to trigger the reporting of the BSR in the case that a second triggering condition for reporting the BSR has been met in the data service transmission performed by a first relayed-to UE with a second relayed-to UE through the relay UE.

In a possible embodiment of the present disclosure, the data service transmission performed by the relayed-to UE with the network device through the relay UE includes: uplink transmission performed by the relayed-to UE for transmitting a data service to the network device through the relay UE; or downlink transmission performed by the relayed-to UE for receiving a data service from the network device through the relay UE.

In a possible embodiment of the present disclosure, the triggering the reporting of the BSR in the case that the first triggering condition for reporting the BSR has been met in the data service transmission performed by the relayed-to UE with the network device through the relay UE includes at least one of: when SCI has been received by the relay UE from the relayed-to UE and reserved resource is indicated in the SCI, triggering the reporting of the BSR; when the relay UE has received the SCI from the relayed-to UE, fails to receive any data, and has fed back to the relayed-to UE a message indicating that the data has been received unsuccessfully, triggering the reporting of the BSR; or when the relay UE has received a request for accessing a network from the relayed-to UE, or a process of requesting, by the relayed-to UE, to access the network has been completed, or the relay UE has received a Sidelink connection establishment request from the relayed-to UE, or a Sidelink connection between the relay UE and the relayed-to UE has been established successfully, triggering the reporting of the BSR.

In a possible embodiment of the present disclosure, the reserved resource indicated in the SCI is reserved for N times of transmission after current transmission, where N is a greater than or equal to 1.

In a possible embodiment of the present disclosure, a buffer size of the BSR is a specific value or a maximum value of a size of data capable of being transmitted through the reserved resource indicated in the SCI; or the buffer size of the BSR is a specific value or a maximum value of a size of data capable of being transmitted through a Sidelink resource indicated in the SCI; or the buffer size of the BSR is a value of a size of data or signaling expected to be transmitted by the relayed-to UE in future.

In a possible embodiment of the present disclosure, a time for triggering the BSR is determined in accordance with a time for the reserved resource indicated in the SCI; or the time for triggering the BSR is determined in accordance with a time for a message fed back by the relay UE to the relayed-to UE and indicating that the data has been received unsuccessfully; or the time for triggering the BSR is determined in accordance with at least one of a time when the request for accessing the network has been received from the relayed-to UE, a time when the process of requesting, by the relayed-to UE, to access the network has been completed, a time when the Sidelink connection establishment request has been received by the relay UE from the relayed-to UE, or a time when the Sidelink connection has been established successfully between the relay UE and the relayed-to UE.

In a possible embodiment of the present disclosure, the triggering the reporting of the BSR in the case that the first triggering condition for reporting the BSR has been met in the downlink transmission performed by the relayed-to UE for receiving the data service from the network device through the relay UE comprises at least one of: when SCI has been transmitted by the relay UE to the relayed-to UE, triggering the reporting of the BSR; when the SCI transmitted by the relay UE to the relayed-to UE indicates that a quantity of times of transmission possibly to be performed in future, triggering the reporting of the BSR; when DCI received by the relay UE from the network device indicates data for downlink transmission, triggering the reporting of the BSR; when the relay UE has transmitted a connection establishment request message to the relayed-to UE or has received a connection establishment request message from the relayed-to UE, triggering the reporting of the BSR; or when the relay UE has received a network paging message for the relayed-to UE or has received a system message or a system message update indication about an air interface between the relay UE and the network device, triggering the reporting of the BSR.

In a possible embodiment of the present disclosure, a buffer size of the BSR is a specific value or a maximum value of a size of data capable of being transmitted through reserved resource or data possibly to be transmitted in future that is indicated in the SCI; or the buffer size of the BSR is any value of a size of data for downlink transmission indicated in the DCI or a value greater than the value of the size of the data for the downlink transmission; or the buffer size of the BSR is any value of a buffer size occupied by control signaling expected to be transmitted subsequently; or the buffer size of the BSR is any value of a size of data expected to be transmitted in future by a network or any value of a size of the system message.

In a possible embodiment of the present disclosure, a time for triggering the BSR by the relay UE is determined in accordance with a time for transmitting the SCI by the relay UE to the relayed-to UE; or the time for triggering the BSR by the relay UE is determined in accordance with a time for the transmission possibly to be performed in future or a time for the reserved resource indicated in the SCI by the relay UE; or the time for triggering the BSR by the relay UE is determined in accordance with a time when the DCI is received by the relay UE; or the time for triggering the BSR by the relay UE is determined in accordance with a time when the connection establishment request message is transmitted by the relay UE to the relayed-to UE or the connection establishment request message is received by the relay UE from the relayed-to UE; or the time for triggering the BSR by the relay UE is determined in accordance with a time when the relay UE receives the network paging message for the relayed-to UE or a time when the relay UE receives the system message or the system message update indication from the network.

In a possible embodiment of the present disclosure, the triggering the reporting of the BSR in the case that the second triggering condition for reporting the BSR has been met in the data service transmission performed by the first relayed-to UE with the second relayed-to UE through the relay UE includes at least one of: when the relay UE has received SCI from the first relayed-to UE or the second relayed-to UE and reserved resource is indicated in the SCI, triggering the BSR; when the relay UE has fed back a message indicating that data has been received unsuccessfully to the first relayed-to UE or the second relayed-to UE, triggering the BSR; when the relay UE has transmitted the SCI to the first relayed-to UE or the second relayed-to UE, triggering the BSR; when the SCI transmitted by the relay UE to the first relayed-to UE or the second relayed-to UE indicates the quantity of times of transmission possibly to be performed in future, triggering the BSR; or when the relay UE has transmitted a connection establishment request message to the first relayed-to UE or the second relayed-to UE or has received a connection establishment request message from the first relayed-to UE or the second relayed-to UE, triggering the BSR.

In a possible embodiment of the present disclosure, the reserved resource indicated in the SCI is reserved for N times of transmission after current transmission, where N is a greater than or equal to 1.

In a possible embodiment of the present disclosure, a buffer size of the BSR is a specific value or a maximum value of a size of data capable of being transmitted through the reserved resource indicated in the SCI; or the buffer size of the BSR is a specific value or a maximum value of a size of data capable of being transmitted through a Sidelink resource indicated in the SCI; or the buffer size of the BSR is the buffer size occupied by control signaling expected to be transmitted subsequently.

In a possible embodiment of the present disclosure, a time for triggering the BSR is determined in accordance with a time for the reserved resource indicated in the SCI; or the time for triggering the BSR is determined in accordance with a time for a message indicating that the data has been received unsuccessfully; or the time for triggering the BSR is determined in accordance with a time when the SCI is transmitted by the relay UE to the first relayed-to UE or the second relayed-to UE; or the time for triggering the BSR is determined in accordance with a time for the transmission to be performed by the relay UE in the SCI; or the time for triggering the BSR is determined in accordance with a time when the connection establishment request message is transmitted by the relay UE to the first relayed-to UE or the second relayed-to UE or a time when the connection establishment request message is received by the relay UE from the first relayed-to UE or the second relayed-to UE.

It should be appreciated that, the UE in the embodiments of the present disclosure corresponds to the above-mentioned method in FIG. 5, and the implementation of the UE may refer to that of the method with a same technical effect. In the UE, the transceiver 71 is in communication with the memory 73 and the processor 72 via a bus interface. A function of the processor 72 may also be implemented through the transceiver 71, and a function of the transceiver 71 may also be implemented through the processor 72. It should be further appreciated that, the UE in the embodiments of the present disclosure is used to implement the steps of the method with a same technical effect, which will not be further particularly defined herein.

The present disclosure further provides in some embodiments a processor-readable storage medium storing therein an instruction to be executed by a processor. The processor is configured to execute the instruction so as to implement the above-mentioned method. The implementation of the processor-readable storage medium may refer to that of the method with a same technical effect.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements.

Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. It should be noted that, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. It should also be noted that, some steps may also be performed in parallel, or independent of each other.

It should be further appreciated that, the above modules in the network device and the UE are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, the determination module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. The processing element mentioned here may be an integrated circuit with signal processing capabilities. In the implementation process, each step of the above method or each module above can be completed by an integrated logic circuit of hardware in the processor element or an instruction in the form of software.

For example, the above modules, units, sub-units or sub-modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A or B" in the specification and the appended claims shall be understood as "there is only A, there is only B, or there are both A and B".

The above are optional implementations of the present disclosure. It should be pointed out that those skilled in the art can make various improvements and modifications without departing from the principles described in the present disclosure. These improvements and modifications should also be within the protection scope of this disclosure.

What is claimed is:

1. A method for reporting a Buffer Status Report (BSR), comprising:
   triggering, by a relay User Equipment (UE), reporting of the BSR in the case that a triggering condition for reporting the BSR has been met;
   transmitting, by the relay UE, the BSR to a network device;

wherein the triggering, by a relay User Equipment (UE), reporting of the BSR in the case that a triggering condition for reporting the BSR has been met comprises:
   triggering, by the relay UE, the reporting of the BSR in the case that a first triggering condition for reporting the BSR has been met in data service transmission performed by a relayed-to-UE with the network device through the relay UE;
   wherein the triggering, by the relay UE, the reporting of the BSR in the case that the first triggering condition for reporting the BSR has been met in the data service transmission performed by the relayed-to UE with the network device through the relay UE comprises at least one of:
      when Sidelink Control Information (SCI) has been received by the relay UE from the relayed-to UE and reserved resource is indicated in the SCI, triggering, by the relay UE, the reporting of the BSR;
      when the relay UE has received the SCI from the relayed-to UE, has not received data successfully, and has fed back to the relayed-to UE a message indicating that the data has been received unsuccessfully, triggering, by the relay UE, the reporting of the BSR;
      when the relay UE has received a request for accessing a network from the relayed-to UE, or when a process of requesting, by the relayed-to UE, to access the network has been completed, or when the relay UE has received a Sidelink connection establishment request from the relayed-to UE, or when a Sidelink connection between the relay UE and the relayed-to UE has been established successfully, triggering, by the relay UE, the reporting of the BSR;
   wherein the reserved resource indicated in the SCI is reserved for N times of transmission after current transmission, where N is greater than or equal to 1.

2. The method according to claim 1, wherein the triggering, by the relay UE, the reporting of the BSR in the case that the triggering condition for reporting the BSR has been met further comprises:
   triggering, by the relay UE, the reporting of the BSR in the case that a second triggering condition for reporting the BSR has been met in the data service transmission performed by a first relayed-to UE with a second relayed-to UE through the relay UE.

3. The method according to claim 1, wherein the data service transmission performed by the relayed-to UE with the network device through the relay UE comprises:
   uplink transmission performed by the relayed-to UE for transmitting a data service to the network device through the relay UE; or
   downlink transmission performed by the relayed-to UE for receiving a data service from the network device through the relay UE.

4. The method according to claim 1, wherein
   a buffer size of the BSR is a specific value or a maximum value of a size of data capable of being transmitted through the reserved resource indicated in the SCI; or
   the buffer size of the BSR is a specific value or a maximum value of a size of data capable of being transmitted through a Sidelink resource indicated in the SCI; or
   the buffer size of the BSR is a value of a size of data or signaling expected to be transmitted by the relayed-to UE in future.

5. The method according to claim 1, wherein a time for triggering the BSR is determined in accordance with a time for the reserved resource indicated in the SCI; or the time for triggering the BSR is determined in accordance with a time for a message fed back by the relay UE to the relayed-to UE and indicating that the data has been received unsuccessfully; or the time for triggering the BSR is determined in accordance with at least one of a time when the request for accessing the network has been received from the relayed-to UE, a time when the process of requesting, by the relayed-to UE, to access the network has been completed, a time when the Sidelink connection establishment request has been received by the relay UE from the relayed-to UE, or a time when the Sidelink connection has been established successfully between the relay UE and the relayed-to UE.

6. The method according to claim 3, wherein the triggering, by the relay UE, the reporting of the BSR in the case that the first triggering condition for reporting the BSR has been met in the downlink transmission performed by the relayed-to UE for receiving the data service from the network device through the relay UE comprises at least one of:

when SCI has been transmitted by the relay UE to the relayed-to UE, triggering, by the relay UE, the reporting of the BSR;

when the SCI transmitted by the relay UE to the relayed-to UE indicates that a quantity of times of transmission possibly to be performed in future, triggering, by the relay UE, the reporting of the BSR;

when Downlink Control Information (DCI) received by the relay UE from the network device indicates data for downlink transmission, triggering, by the relay UE, the reporting of the BSR;

when the relay UE has transmitted a connection establishment request message to the relayed-to UE or has received a connection establishment request message from the relayed-to UE, triggering, by the relay UE, the reporting of the BSR; or when the relay UE has received a network paging message for the relayed-to UE or has received a system message or a system message update indication about an air interface between the relay UE and the network device, triggering, by the relay UE, the reporting of the BSR.

7. The method according to claim 6, wherein a buffer size of the BSR is a specific value or a maximum value of a size of data capable of being transmitted through reserved resource or data possibly to be transmitted in future that is indicated in the SCI; or the buffer size of the BSR is any value of a size of data for downlink transmission indicated in the DCI or a value greater than the value of the size of the data for the downlink transmission; or the buffer size of the BSR is any value of a buffer size occupied by control signaling expected to be transmitted subsequently; or the buffer size of the BSR is any value of a size of data expected to be transmitted in future by a network or any value of a size of the system message.

8. The method according to claim 6, wherein a time for triggering the BSR by the relay UE is determined in accordance with a time for transmitting the SCI by the relay UE to the relayed-to UE; or the time for triggering the BSR by the relay UE is determined in accordance with a time for the transmission possibly to be performed in future or a time for the reserved resource indicated in the SCI by the relay UE; or the time for triggering the BSR by the relay UE is determined in accordance with a time when the DCI is received by the relay UE; or the time for triggering the BSR by the relay UE is determined in accordance with a time when the connection establishment request message is transmitted by the relay UE to the relayed-to UE or the connection establishment request message is received by the relay UE from the relayed-to UE; or the time for triggering the BSR by the relay UE is determined in accordance with a time when the relay UE receives the network paging message for the relayed-to UE or a time when the relay UE receives the system message or the system message update indication from the network.

9. The method according to claim 2, wherein the triggering, by the relay UE, the reporting of the BSR in the case that the second triggering condition for reporting the BSR has been met in the data service transmission performed by the first relayed-to UE with the second relayed-to UE through the relay UE comprises at least one of:

when the relay UE has received SCI from the first relayed-to UE or the second relayed-to UE and reserved resource is indicated in the SCI, triggering, by the relay UE, the BSR;

when the relay UE has fed back a message indicating that data has been received unsuccessfully to the first relayed-to UE or the second relayed-to UE, triggering, by the relay UE, the BSR;

when the relay UE has transmitted the SCI to the first relayed-to UE or the second relayed-to UE, triggering, by the relay UE, the BSR;

when the SCI transmitted by the relay UE to the first relayed-to UE or the second relayed-to UE indicates the quantity of times of transmission possibly to be performed in future, triggering, by the relay UE, the BSR; or when the relay UE has transmitted a connection establishment request message to the first relayed-to UE or the second relayed-to UE or has received a connection establishment request message from the first relayed-to UE or the second relayed-to UE, triggering, by the relay UE, the BSR.

10. The method according to claim 9, wherein the reserved resource indicated in the SCI is reserved for N times of transmission after current transmission, where N is a greater than or equal to 1.

11. The method according to claim 9, wherein a buffer size of the BSR is a specific value or a maximum value of a size of data capable of being transmitted through the reserved resource indicated in the SCI; or the buffer size of the BSR is a specific value or a maximum value of a size of data capable of being transmitted through a Sidelink resource indicated in the SCI; or the buffer size of the BSR is the buffer size occupied by control signaling expected to be transmitted subsequently.

12. The method according to claim 9, wherein a time for triggering the BSR by the relay UE is determined in accordance with a time for the reserved resource indicated in the SCI; or the time for triggering the BSR by the relay UE is
determined in accordance with a time for feeding back
a message indicating that the data has been received
unsuccessfully; or the time for triggering the BSR by the relay UE is
determined in accordance with a time when the SCI is
transmitted by the relay UE to the first relayed-to UE or
the second relayed-to UE; or the time for triggering the BSR by the relay UE is
determined in accordance with a time that is for the
transmission possibly to be performed in future and is
indicated by the relay UE in the SCI; or the time for triggering the BSR by the relay UE is
determined in accordance with a time when the con-
nection establishment request message is transmitted
by the relay UE to the first relayed-to UE or the second
relayed-to UE or a time when the connection establish-
ment request message is received by the relay UE from
the first relayed-to UE or the second relayed-to UE.

13. A relay UE, comprising a transceiver, a processor, a
memory and a program instruction stored in the memory and
capable of being executed by the processor, wherein the
program instruction, when executed by the processor, causes
the processor to implement:

triggering reporting of the BSR in the case that a trigger-
ing condition for reporting the BSR has been met; and
transmitting the BSR to a network device;

wherein the triggering reporting of the BSR in the case
that a triggering condition for reporting the BSR has
been met comprises:

wherein triggering, by the relay UE, the reporting of the
BSR in the case that a first triggering condition for
reporting the BSR has been met in data service trans-
mission performed by a relayed-to-UE with the net-
work device through the relay UE;

wherein the triggering the reporting of the BSR in the case
that the first triggering condition for reporting the BSR
has been met in the data service transmission per-
formed by the relayed-to UE with the network device
through the relay UE comprises at least one of:

when SCI has been received by the relay UE from the
relayed-to UE and reserved resource is indicated in
the SCI, triggering, by the relay UE, the reporting of
the BSR;

when the relay UE has received the SCI from the
relayed-to UE, has not received data successfully,
and has fed back to the relayed-to UE a message
indicating that the data has been received unsuccess-
fully, triggering, by the relay UE, the reporting of the
BSR;

when the relay UE has received a request for accessing
a network from the relayed-to UE, or when a process
of requesting, by the relayed-to UE, to access the
network has been completed, or when the relay UE
has received a Sidelink connection establishment
request from the relayed-to UE, or when a Sidelink
connection between the relay UE and the relayed-to
UE has been established successfully, triggering, by
the relay UE, the reporting of the BSR;

wherein the reserved resource indicated in the SCI is
reserved for N times of transmission after current
transmission, where N is greater than or equal to 1.

14. The relay UE according to claim 13, wherein the
triggering reporting of the BSR in the case that a triggering
condition for reporting the BSR has been met comprises:
triggering the reporting of the BSR in the case that a
second triggering condition for reporting the BSR has been met in the data service transmission performed by
a first relayed-to UE with a second relayed-to UE
through the relay UE.

15. The relay UE according to claim 13, wherein the data
service transmission performed by the relayed-to UE with
the network device through the relay UE comprises:

uplink transmission performed by the relayed-to UE for
transmitting a data service to the network device
through the relay UE; or downlink transmission performed by the relayed-to UE
for receiving a data service from the network device
through the relay UE.

16. The relay UE according to claim 13, wherein a buffer size of the BSR is a specific value or a maximum
value of a size of data capable of being transmitted
through the reserved resource indicated in the SCI; or the buffer size of the BSR is a specific value or a
maximum value of a size of data capable of being
transmitted through a Sidelink resource indicated in the
SCI; or the buffer size of the BSR is a value of a size of data or
signaling expected to be transmitted by the relayed-to
UE in future.

17. The relay UE according to claim 13, wherein a time for triggering the BSR is determined in accordance
with a time for the reserved resource indicated in the
SCI; or the time for triggering the BSR is determined in accor-
dance with a time for a message fed back by the relay
UE to the relayed-to UE and indicating that the data has
been received unsuccessfully; or the time for triggering the BSR is determined in accor-
dance with at least one of a time when the request for
accessing the network has been received from the
relayed-to UE, a time when the process of requesting,
by the relayed-to UE, to access the network has been
completed, a time when the Sidelink connection estab-
lishment request has been received by the relay UE
from the relayed-to UE, or a time when the Sidelink
connection has been established successfully between
the relay UE and the relayed-to UE.

18. The relay UE according to claim 15, wherein the
triggering, by the relay UE, the reporting of the BSR in the
case that the first triggering condition for reporting the BSR
has been met in the downlink transmission performed by the
relayed-to UE for receiving the data service from the net-
work device through the relay UE comprises at least one of:

when SCI has been transmitted by the relay UE to the
relayed-to UE, triggering, by the relay UE, the report-
ing of the BSR;

when the SCI transmitted by the relay UE to the relayed-
to UE indicates that a quantity of times of transmission
possibly to be performed in future, triggering, by the
relay UE, the reporting of the BSR;

when Downlink Control Information (DCI) received by
the relay UE from the network device indicates data for
downlink transmission, triggering, by the relay UE, the
reporting of the BSR;

when the relay UE has transmitted a connection estab-
lishment request message to the relayed-to UE or has
received a connection establishment request message
from the relayed-to UE, triggering, by the relay UE, the
reporting of the BSR; or when the relay UE has received a network paging mes-
sage for the relayed-to UE or has received a system
message or a system message update indication about an air interface between the relay UE and the network device, triggering, by the relay UE, the reporting of the BSR.

19. The relay UE according to claim 18, wherein a buffer size of the BSR is a specific value or a maximum value of a size of data capable of being transmitted through reserved resource or data possibly to be transmitted in future that is indicated in the SCI; or the buffer size of the BSR is any value of a size of data for downlink transmission indicated in the DCI or a value greater than the value of the size of the data for the downlink transmission; or the buffer size of the BSR is any value of a buffer size occupied by control signaling expected to be transmitted subsequently; or the buffer size of the BSR is any value of a size of data expected to be transmitted in future by a network or any value of a size of the system message.

20. The relay UE according to claim 18, wherein a time for triggering the BSR by the relay UE is determined in accordance with a time for transmitting the SCI by the relay UE to the relayed-to UE; or the time for triggering the BSR by the relay UE is determined in accordance with a time for the transmission possibly to be performed in future or a time for the reserved resource indicated in the SCI by the relay UE; or the time for triggering the BSR by the relay UE is determined in accordance with a time when the DCI is received by the relay UE; or the time for triggering the BSR by the relay UE is determined in accordance with a time when the connection establishment request message is transmitted by the relay UE to the relayed-to UE or the connection establishment request message is received by the relay UE from the relayed-to UE; or the time for triggering the BSR by the relay UE is determined in accordance with a time when the relay UE receives the network paging message for the relayed-to UE or a time when the relay UE receives the system message or the system message update indication from the network.

* * * * *